Sept. 7, 1965  O. ZUMKELLER  3,204,869

REGISTER WHEEL POSITIONING APPARATUS

Filed July 10, 1964

INVENTOR
Oskar Zumkeller
by Michael J. Striker

United States Patent Office 3,204,869
Patented Sept. 7, 1965

3,204,869
REGISTER WHEEL POSITIONING APPARATUS
Oskar Zumkeller, Villingen, Germany, assignor to Kienzle Apparate G.m.b.H., Villingen, Black Forest, Germany
Filed July 10, 1964, Ser. No. 381,758
Claims priority, application Germany, July 11, 1963, K 50,191
10 Claims. (Cl. 235—117)

The present invention relates to an apparatus for positioning a register wheel, and more particularly to an apparatus for positioning the first number wheel of a counter which may indicate for print the result, or which may be directly read out.

In accordance with prior art constructions, continuously operable counters which are electrically or optically read out after measurements, or whose stored value is to be printed out, are set to register or indicate an integer number before the stored value is read out or printed out. Since in some cases, the measuring functions or counting functions follow each other in very rapid succession, it is of importance that such setting or resetting is rapidly accomplished. Devices are known in which the counter is set to an integer indication directly before the printing out or reading out. As a result, there is more time required for the printing operation, and the devices required for setting the counter are rather complicated. It is one object of the present invention to overcome the disadvantages of the known devices for setting of a counter, register or like apparatus and to provide a device which sets a register, counter or the like to an integer registration directly after a counting operation.

Another object of the invention is to provide a device for automatically setting the register wheel or number wheel of the lowest order of a counter or register to a position representing an integer, or other selected numerical value.

Another object of the invention is to provide a device for setting a register wheel to represent the next higher value of a series of numerical values, if the register wheel stops after a counting operation in an intermediate position between two number positions.

Another object of the invention is to provide a device for positioning the register wheel of the lowest order of a counter in a position representing an integer directly after a register wheel has stopped in a position representing a numerical value different from an integer by a selected value.

With these objects in view, one embodiment of the invention comprises a rotary register wheel or number wheel having a series of number positions, and positions intermediate the number positions; drive means for turning the register wheel an angular distance corresponding to a value to be represented by the register wheel so that the same stops either in a number position or in an intermediate position; and means for shifting the register wheel from any one of the intermediate positions to an adjacent position. The shifting means are only actuated when the register wheel stops in one of the intermediate positions, so that the register wheel is automatically set to a number position, preferably the next following number position, when it happens to stop in an intermediate position.

Sensing means are provided for sensing the intermediate positions and number positions, and are actuated when the register wheel stops in one of the intermediate positions. When the sensing means are actuated, the stopped register wheel is shifted from the respective intermediate position to an adjacent number position.

In the preferred embodiment of the invention, a sensing contact rotates in synchronism with the register wheel, and passes over first and second alternate control portions which respectively correspond to intermediate and numbered positions of the register wheel. In one embodiment of the invention, the alternate control portions are non-conductive and conductive portions of a control member which are sensed by the sensing contact means during rotation of the same together with the register wheel. A relay is provided in the circuit of the sensing contact and operates a switch by which an electromagnetic means operating a shifting pawl of a stepping wheel secured to the register wheel is operated.

A capacitor prevents the switch from completing the circuit of the electromagnetic shifting means while the register wheel rotates since it discharges and maintains the relay energized while non-conductive portions of the control member are engaged by the sensing contact. However, when the register wheel and control member stop, and the sensing contact is located on a non-conductive portion of the control member, corresponding to an intermediate position of the register wheel, then the electromagnetic shifting means is actuated, and the register wheel shifted to a number position representing, for example, an integer.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

Figure 2A:
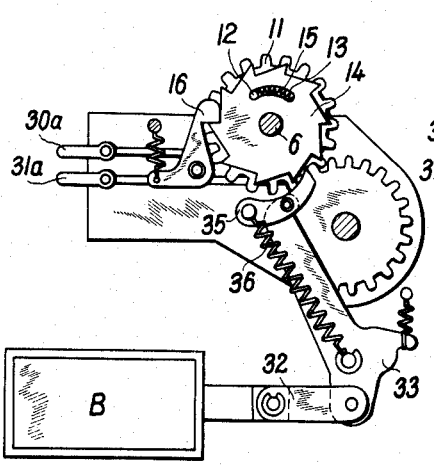
FIG. 2a is a sectional view taken on line II—II and illustrating a first operational position of the apparatus.

Referring now to the drawings, the register wheels or number wheels 1 to 5 of a counter are mounted in a conventional manner on a shaft 6 which is supported on transverse walls 7 and 8. A drive shaft 9, by which the counter is operated, drives through a gear 10 another gear 11 which is mounted on a shaft 6 for free turning movement. Gear 11 has a transverse coupling pin 12 projecting into a part-circular slot 13 in a stepping wheel 14 which has peripheral teeth circumferentially spaced equal distances corresponding to the number positions of the first register wheel 1 in which the same indicates the digits 0 to 9.

Stepping wheel 14 is fixedly secured to register wheel 1 for turning movement. A spring 15 located in slot 13 of stepping wheel 14 urges the stepping wheel and the number wheel to a position in which the end of slot 13 abuts coupling pin 12 of gear 11 so that the first register wheel is positively driven in counterclockwise direction, as viewed in FIGS. 2a and 2b, from shaft 9, while stepping wheel 14 is free to turn faster than gear 11 within the limits determined by the circumferential length of slot 13.

A locking pawl 16 is loaded by a spring 17 to engage the teeth of stepping wheel 14 to block clockwise movement of the stepping wheel. The register wheels 1 to 5 are connected by conventional tens-transfer means 18 which are mounted on a shaft 19 and are located in cutouts of contact carrier plates 20. Contact carrier plates 20 are mounted between the walls 7 and 8, and have a number of contact pieces corresponding to the number positions of the register wheels, and connected by individual conductive lines to apparatus for reading out the value registered in the counter. Every register wheel has a slide contact 21 which successively engages the contact pieces on contact plates 20 during the turning movement of the respective register wheel. The above described counter can thus be electrically read out, but the apparatus of the invention is applicable to any other register or counter which indicates numerical values or prints the same.

The counter is cleared by a gear pinion 22 fixedly secured to shaft 6 and cooperating with a segment 23 mounted on shaft 9. Segment 23 is driven through a gear transmission 24 by a motor 25 when clearing of the counter to zero position is desired.

Figure 2B:
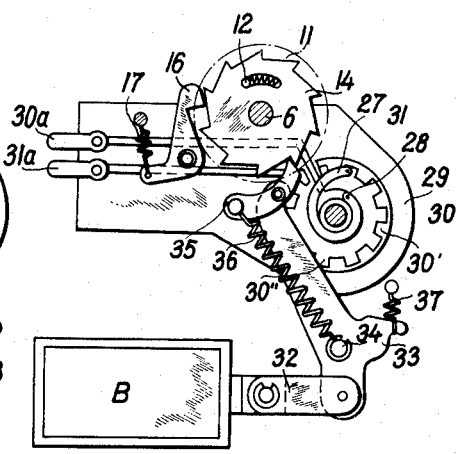
FIG. 2b is a sectional view taken on line II—II and illustrating another operational position of the device.

Shaft 9 drives a sensing contact means 26 including two slide contacts 27 and 28, best seen in FIG. 2b. Slide contacts 27, 28 have different radii and respectively cooperate with circular contacts 30 and 31 which are connected to each other by contacts 27 and 28 of the sensing contact means 26. While contact 31 is a slide ring, contact 30 includes a series of conductive control portions 30' separated by non-conductive control portions 30" which alternate in the circular path on which sensing contact 27 slides.

Figure 3:
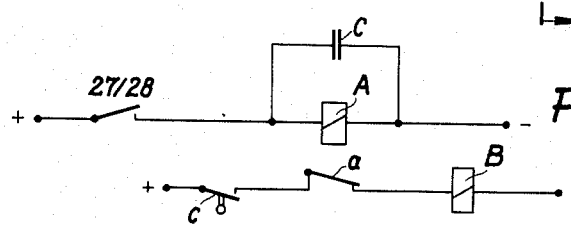
FIG. 3 is a diagram illustrating the electrical circuit of the apparatus.

The sensing contact means 26, and more particularly the sensing contact 27, rotate in synchronism with the rotation of register wheel 1, and whenever register wheel 1 is in a position intermediate to number positions in which an integer is indicated, contact 27 is located on a non-conductive position 30" whereas whenever number wheel 1 is located in a number position in which a digit is indicated, sensing contact 27 is located on a conductive portion 30'. The circumferential extension of the control portions 30' and 30" may be selected to be substantially equal, in which event the connection between the circular contacts 30 and 31 is interrupted during half a step of the stepping wheel 14, whereas during the other half of the step, the circular contacts 30 and 31 are connected to each other. Electric conductors 30a and 31a respectively connect contacts 30 and 31 with the other parts of the electric circuit of the device as best seen in FIG. 3. A relay A is connected in series with the sensing contact means 26 so that the relay is de-energized when contact 27 engages a non-conductive portion 30", and is energized when contact 27 engages a conductive portion 30'. A capacitor C is connected in parallel with relay A.

A switch a is normally closed, but is opened when relay A is energized. Switch a is connected in series with an electromagnetic means B and is connected with a switch c which is closed during operation of the counter, or whenever there are any values indicated by the counter, which have neither been indicated electrically nor printed out.

Figure 1:
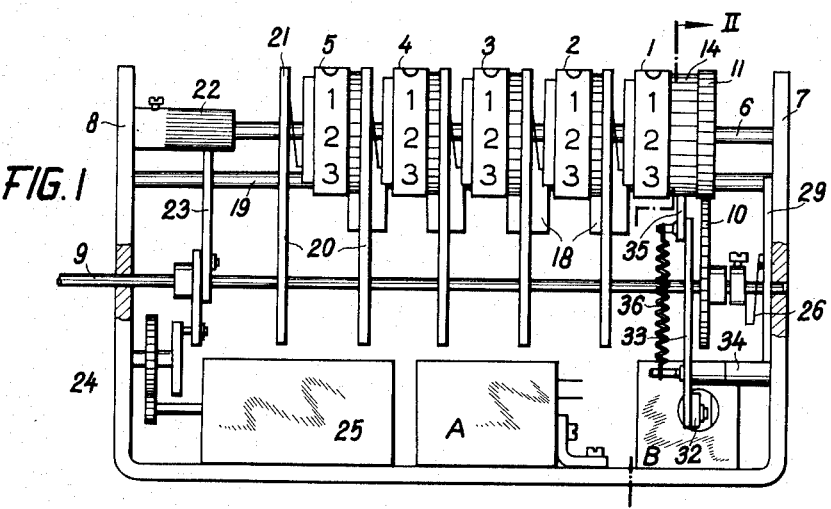
FIG. 1 is a fragmentray schematic front view, partially in section, illustrating a counter provided with the apparatus of the invention.

As shown in FIGS. 1, 2a, and 2b, electromagnetic means B has an armature pivotally connected to a link 32 which operates a shifting member 33 which is biased by a spring 37 to turn in counterclockwise direction to the position shown in FIG. 2a. Shifting member 33 carries a shifting pawl 35 which is biased by spring 36 to engage the teeth of stepping wheel 14. When switch a is closed, and electromagnetic means B energized, shifting member 33 and shifting pawl 35 are in the positions shown in FIG. 2a in which the point of shifting pawl 35 rests on a tooth of stepping wheel 14 spaced from the steep flank of the next following tooth.

The apparatus operates as follows:

The counter is continuously driven by drive shaft 9 through gears 10 and 11, coupling pin 12, and stepping wheel 14 which is secured to the first register wheel 1 by which the other register wheels are driven when the registered value exceeds 10 units. During the rotation of register wheel 1, sensing contact means 26, 27, 28 rotate in synchronism with register wheel 1, and contact 27 alternately engages non-conductive portions 30" and conductive portions 30 so that the connection of relay A to the voltage source is alternately interrupted, the arrangement being such that relay A is connected to the voltage source when register wheel 1 is in a number position representing an integer value, while relay A is disconnected from the voltage source when register wheel 1 is in an intermediate position. However, although relay A is disconnected from the voltage source by the non-conductive portions 30", it is not de-energized because capacitor C discharges and maintains relay A energized while contact 27 passes over a non-conductive portion 30" which takes only a short time during rotation of register wheel 1 and sensing contact means 26 to 28.

Consequently, as long as the counter operates and register wheel 1 turns, the relay A is continuously energized and holds relay switch a in an open position in which electromagnetic means B is disconnected from the source of voltage, and consequently de-energized.

When a counting operation is terminated, the counter stops in a random position in which register wheel 1 may be in a number position representing one of the digits, or closely adjacent to such a position, or register wheel 1 may be in an intermediate position between two number positions. In this event, contact 27 is located on a non-conductive portion 30" when the counter stops, and after capacitor C has discharged and maintained relay A monentarily energized, relay A is de-energized since the connection to the voltage source is interrupted, and consequently switch a closes and causes energization of electromagnetic means B.

Electromagnetic means B shifts link 32 shifting member 33 and pawl 35 so that pawl 35 engages the shoulder of the next following tooth of the stepping wheel 14 and turn the same together with register wheel 1 a small angle until register wheel 1 is in the next following number position.

In the event that the counter stops after a counting operation in a position in which contact 27 is located on a conductive portion 30', then relay A remains energized since it is connected by contacts 27, 28, 30, 31 to the source of voltage, and consequently switch a remains open so that electromagnetic means B does not operate the shifting means 33, 35, 14. The arrangement is preferably such that no correction of the position of register wheel 1 is carried out if the same is in a position within the first three decimal fractions, for example in positions 1.3, 2.3, or 3.3, etc. If the register wheel 1 stops in intermediate position, for example representing the values 1.4 to 1.9, or 2.4 to 2.9, the shifting means are operated, and the register wheel positioned to represent the next following digits. The range of adjustment is determined by the circumferential extension of control portions 30' and 30".

It will be understood that each of the elements described above or two or more together, may also find a useful application in other types of counters differing from the types described above.

While the invention has been illustrated and described as embodied in an apparatus for positioning a register wheel in a position representing an integer when a preceding counting operation resulted in a fraction, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. An apparatus for positioning a register wheel or the like, comprising, in combination, a rotary register wheel having a series of number positions, and positions intermediate said number positions; drive means for turning said register wheel an angular distance corresponding to a value to be represented by said register wheel so that the same stops either in a number position or in an intermediate position; a control element having first and second alternate control portions; a sensing element for sensing said control portions and cooperating with said first and second control portions when said register wheel is in said intermediate position and number positions, respectively, one of said elements rotating in synchronism with said register wheel; shifting means and including a stepping wheel secured to said register wheel for rotation therewith, and a shifting pawl for shifting said register wheel from any intermediate position to an adjacent number position; electromagnetic means for actuating said shifting pawl; and a switch for energizing said electromagnetic means when said sensing means cooperates with one of said first control portions upon stopping of said register wheel.

2. An apparatus for positioning a register wheel or the like, comprising, in combination, a rotary register wheel having a series of number positons, and positions intermediate said number positions; drive means for turning said register wheel an angular distance corresponding to a value to be represented by said register wheel so that the same stops either in a number position or in an intermediate position; a control member having first and second sets of alternate control portions, the control portions of one set being conductive and the control portions of the other set being non-conductive; sensing contact means rotating in synchronism with said register wheel and cooperating with said first control portions when said register wheel is in said intermediate positions, and with said second control portions when said register wheel is in said number positions; shifting means and including a stepping wheel secured to said register wheel for rotation therewith, and a shifting pawl for shifting said register wheel from any intermediate position to an adjacent number position; electromagentic means for actuating said shifting pawl; and a switch for energizing said electromagnetic means and means for actuating said shifting means and being actuated when said sensing contact means cooperates with one of said first control portions upon stopping of said register wheel.

3. An apparatus for positioning a register wheel or the like, comprising, in combination, a rotary register wheel having a series of number positions, and positions intermediate said number positions; drive means for turning said register wheel an angular distance corresponding to a value to be represented by said register wheel so that the same stops either in a number position or in an intermediate position; a control element having alternating sets of non-conductive and conductive control portions; a sensing contact element, one of said elements rotating in synchronism with said register wheel so that said sensing contact element cooperates with said sets of non-conductive and conductive control portions when said register wheel is in said intermediate and number positions; relay means actuated by said sensing contact element when the same cooperates with one of said control portions; a switch actuated by said relay means when said register wheel stops in one of said intermediate positions; shifting means for shifting said register wheel from any intermediate position to an adjacent number position; and electromagnetic means controlled by said switch to operate said shifting means.

4. An apparatus for positioning a register wheel or the like, comprising, in combination, a rotary register wheel having a series of number positions, and positions intermediate said number positions; drive means for turning said register wheel an angular distance corresponding to a value to be represented by said register wheel so that the same stops either in a number position or in an intermediate position; a control element having alternating sets of non-conductive and conductive control portions; a sensing contact element, one of said elements rotating in synchronism with said register wheel so that said sensing contact element cooperates with said sets of non-conductive and conductive control portions when said register wheel is in said intermediate and number positions; relay means actuated by said sensing contact element when the same cooperates with one of said sets of control portions; a capacitor for energizing said relay means while said sensing contact element passes over said non-conductive control portions during rotation of said register wheel; a switch actuated by said relay means when said register wheel stops in one of said intermediate positions; shifting means for shifting said register wheel from any intermediate position to an adjacent number position; and electromagnetic means controlled by said switch to operate said shifting means.

5. An apparatus for positioning a register wheel or the like, comprising, in combination, a rotary register wheel having a series of number positions, and positions intermediate said number positions; drive means for turning said register wheel an angular distance corresponding to a value to be represented by said register wheel so that the same stops either in a number position or in an intermediate position; a control element having alternating sets of non-conductive and conductive control portions; a sensing contact element, one of said elements rotating in synchronism with said register wheel so that said sensing contact element cooperates with said sets of non-conductive and conductive control portions when said register wheel is in said intermediate and number positions; relay means actuated by said sensing contact element when the same cooperates with one of said sets of control portions; a capacitor for energizing said relay means while said sensing contact element passes over said non-conductive control portions during rotation of said register wheel; a normally closed switch opened by said actuated relay means and adapted to close upon stopping of said register wheel and of said sensing contact means while cooperating with the other set of control portions; shifting means for shifting said register wheel from any intermediate positions to an adjacent number position; and electromagnetic means controlled by said switch to operate said shifting means.

6. An apparatus for positioning a register wheel or the like, comprising, in combination, a rotary register wheel having a series of number positions, and positions intermediate said number positions; drive means for turning said register wheel an angular distance corresponding to a value to be represented by said register wheel so that the same stops either in a number position or in an intermediate position; a control element having alternating sets of non-conductive and conductive control portions; a sensing contact element, one of said elements rotating in synchronism with said register wheel so that said sensing contact element cooperates with said sets of non-conductive and conductive control portions when said register wheel is in said intermediate and number positions; relay means actuated by said sensing contact element when the same cooperates with one of said sets of control portions; a capacitor for energizing said relay means while said sensing contact element passes over said non-conductive control portions during rotation of said register wheel; a switch actuated by said relay means when said register wheel stops in one of said intermediate positions; shifting means including a stepping wheel secured to said register wheel and a shifting pawl for shifting said stepping wheel and thereby said register wheel from any intermediate position to the next following number position; and electromagnetic means controlled by said switch to operate said shifting pawl.

7. An apparatus for positioning a register wheel or the like, comprising, in combination, a rotary register wheel having a series of number positions, and positions intermediate said number positions; drive means for turning said register wheel an angular distance coresponding to a value to be represented by said register wheel so that the same stops either in a number position or in an intermediate position; a control element having alternating sets of non-conductive and conductive control portions; a sensing contact element, one of said elements rotating in synchronism with said register wheel so that said sensing contact element cooperates with said sets of non-conductive and conductive control portions when said register wheel is in said intermediate and number positions; relay means actuated by said sensing contact element when the same cooperates with one of said sets of control portions; a capacitor for energizing said relay means while said sensing contact element passes over said non-conductive control portions during rotation of said register wheel; a normally closed switch opened by said actuated relay means and adapted to close upon stopping of said register wheel and of said sensing contact means while cooperating with the other set of control portions; shifting means including a stepping wheel secured to said register wheel and a shifting pawl for shifting said stepping wheel and thereby said register wheel from any intermediate position to the next following number position; and electromagnetic means controlled by said closed switch to operate said shifting pawl.

8. An apparatus for positioning a register wheel or the like, comprising, in combination, a rotary register wheel having a series of number positions, and positions intermediate said number positions; drive means for turning said register wheel an angular distance corresponding to a value to be represented by said register wheel so that the same stops either in a number position or in an intermediate position; a control element having alternating non-conductive and conductive control portions; a sensing contact element, rotating in synchronism with said register wheel so that said sensing contact element cooperates with said non-conductive and conductive control portions, respectively, when said register wheel is in said intermediate and number positions, respectively; relay means energized by said sensing contact element when the same cooperates with one of said conductive control portions; a capacitor for energizing said relay means while said sensing contact element passes over said non-conductive control portions during rotation of said register wheel; a switch actuated by said relay means when said register wheel stops in one of said intermediate positions; shifting means for shifting said register wheel from any intermediate position to an adjacent number position; and electromagnetic means controlled by said switch to operate said shifting means.

9. An apparatus for positioning a register wheel or the like, comprising, in combination, a rotary register wheel having a series of number positions, and positions intermediate said number positions; drive means for turning said register wheel an angular distance corresponding to a value to be represented by said register wheel so that the same stops either in a number position or in an intermediate position; a control element having alternating non-conductive and conductive control portions; a sensing contact element, rotating in synchronism with said register wheel so that said sensing contact element cooperates with said non-conductive and conductive control portions, respectively, when said register wheel is in said intermediate and number positions, respectively; relay means energized by said sensing contact element when the same cooperates with one of said conductive control portions; a capacitor for energizing said relay means while said sensing contact element passes over said non-conductive control portions during rotation of said register wheel; a normally closed switch opened by said energized relay means and adapted to close upon stopping of said register wheel and of said sensing contact means while cooperating with one of said non-conductive control portions; shifting means including a stepping wheel secured to said register wheel and a shifting pawl for shifting said stepping wheel and thereby said register wheel from any intermediate position to the next following number position; and electromagnetic means controlled by said closed switch to operate said shifting pawl.

10. An apparatus as set forth in claim 9 and including one-way coupling means connecting said stepping wheel with said drive means; said stepping wheel being secured to said register wheel.

References Cited by the Examiner

UNITED STATES PATENTS 2,617,870 11/52 Kern.
3,038,659 6/62 Unterberger _____ 235—117

LEYLAND M. MARTIN, *Primary Examiner.*

LEO SMILOW, *Examiner.*